US011403686B1

(12) United States Patent
Barakat et al.

(10) Patent No.: US 11,403,686 B1
(45) Date of Patent: Aug. 2, 2022

(54) SYSTEMS AND METHODS FOR IDENTIFYING A STEWARD

(71) Applicant: Wells Fargo Bank, N.A., San Francisco, CA (US)

(72) Inventors: Wayne Barakat, Novato, CA (US); Ha M. Duong, San Francisco, CA (US); Yvette Hatton, San Francisco, CA (US); Chris Kalaboukis, San Jose, CA (US); Marria Rhodriquez, San Francisco, CA (US)

(73) Assignee: Wells Fargo Bank, N.A, San Francisco, CA (US)

( * ) Notice: Subject to any disclaimer, the term of this patent is extended or adjusted under 35 U.S.C. 154(b) by 800 days.

(21) Appl. No.: 15/393,908

(22) Filed: Dec. 29, 2016

(51) Int. Cl.
*G06Q 30/06* (2012.01)
*G06F 16/22* (2019.01)
*G06F 21/00* (2013.01)
*G06K 9/46* (2006.01)

(52) U.S. Cl.
CPC ......... *G06Q 30/0617* (2013.01); *G06F 16/22* (2019.01)

(58) Field of Classification Search
CPC .......... G06Q 20/227; G06Q 20/35785; G06Q 20/385; G06Q 50/18; G06Q 50/186; G06F 21/604; G06F 2221/2149; G06F 2221/2141; G06F 2221/2133; H04L 51/20; H04L 51/046; H04L 51/12; H04L 51/043; H04L 63/108; H04L 63/10; H04L 67/107; H04L 63/105; H04L 63/104; H04L 63/102; H04L 63/101; H04L 51/16; H04L 67/22; H04L 67/34
See application file for complete search history.

(56) References Cited

U.S. PATENT DOCUMENTS

| 5,914,472 | A | * | 6/1999 | Foladare | G06Q 20/04 |
| | | | | | 235/380 |
| 6,042,005 | A | * | 3/2000 | Basile | G06Q 20/346 |
| | | | | | 235/382 |
| 7,181,017 | B1 | * | 2/2007 | Nagel | H04L 9/0825 |
| | | | | | 380/282 |
| 7,353,465 | B2 | | 4/2008 | Callaway et al. | |
| 7,882,433 | B2 | | 2/2011 | Callaway et al. | |

(Continued)

OTHER PUBLICATIONS file:///C:/Users/damsdell/AppData/Local/Microsoft/Windows/INetCache/Content.Outlook/CPFX4CPH/609a6451-60b2-4e36-bc98-2c6e2e8c5bc5.pdf (Year: 2011).*

(Continued)

*Primary Examiner* — Florian M Zeender
*Assistant Examiner* — Dana Amsdell
(74) *Attorney, Agent, or Firm* — Foley & Lardner LLP

(57) ABSTRACT

A financial institution computing system may include a steward database and a steward designation circuit. The steward database may store information of a steward of a customer. The information may include interaction information of the steward, which may include information indicative of interactions of the steward with other individuals. The steward designation circuit may determine whether an individual of the other individuals qualifies as a new steward of the customer based on the interaction information of the steward in the steward database. The steward designation circuit may designate the individual as a new steward of the customer in response to determining that the individual qualifies as a new steward of the customer.

18 Claims, 5 Drawing Sheets

(56) References Cited

U.S. PATENT DOCUMENTS

| | | | | |
|---|---|---|---|---|
| 8,296,228 | B1* | 10/2012 | Kloor | G06Q 20/40 705/39 |
| 8,365,293 | B2* | 1/2013 | Brown | H04L 63/0823 705/51 |
| 9,076,009 | B2* | 7/2015 | Sathish | H04L 63/107 |
| 9,363,250 | B2 | 6/2016 | Matthews et al. | |
| 9,372,999 | B2 | 6/2016 | Handler | |
| 10,122,723 | B1* | 11/2018 | Chang | G06F 21/604 |
| 2003/0061111 | A1* | 3/2003 | Dutta | G06Q 30/0601 705/26.1 |
| 2003/0154097 | A1 | 8/2003 | Hartley et al. | |
| 2003/0197058 | A1* | 10/2003 | Benkert | G06Q 20/227 235/380 |
| 2004/0039694 | A1* | 2/2004 | Dunn | G06Q 20/04 705/39 |
| 2004/0143527 | A1* | 7/2004 | Benkert | G06Q 20/04 705/35 |
| 2005/0038675 | A1 | 2/2005 | Siekman et al. | |
| 2007/0118449 | A1* | 5/2007 | De La Motte | G06Q 40/00 705/35 |
| 2008/0005325 | A1* | 1/2008 | Wynn | G06Q 10/107 709/225 |
| 2008/0140569 | A1* | 6/2008 | Handel | G06Q 20/382 705/64 |
| 2008/0294462 | A1 | 11/2008 | Nuhaan et al. | |
| 2008/0306872 | A1* | 12/2008 | Felsher | G06F 19/328 705/51 |
| 2010/0274691 | A1* | 10/2010 | Hammad | G06Q 20/3221 705/30 |
| 2011/0150340 | A1* | 6/2011 | Gotoh | G06V 40/175 382/190 |
| 2011/0237222 | A1* | 9/2011 | Niejadlik | H04L 63/10 455/411 |
| 2012/0171990 | A1* | 7/2012 | Williams | H04W 4/24 455/406 |
| 2012/0278202 | A1* | 11/2012 | Webber | G06Q 20/405 705/26.41 |
| 2013/0018792 | A1* | 1/2013 | Casey | G06Q 40/02 705/44 |
| 2013/0024516 | A1* | 1/2013 | Blinder | H04L 51/32 709/204 |
| 2013/0317976 | A1 | 11/2013 | Oh et al. | |
| 2014/0025724 | A1 | 1/2014 | Granger et al. | |
| 2014/0040129 | A1* | 2/2014 | Akin | G06Q 20/4037 705/44 |
| 2014/0081667 | A1* | 3/2014 | Joao | G06F 19/328 705/3 |
| 2014/0331278 | A1* | 11/2014 | Tkachev | H04L 63/08 726/1 |
| 2015/0278453 | A1 | 10/2015 | Joao | |
| 2016/0034709 | A1 | 2/2016 | Englehardt et al. | |
| 2016/0155072 | A1 | 6/2016 | Prodromidis et al. | |
| 2018/0137585 | A1* | 5/2018 | Van Niekerk | G06Q 10/10 |

OTHER PUBLICATIONS https://www.justia.com/estate-planning/trusts/trustee-duties-and-liabilities/ (Year: 2015).*

Hickley, Matthew; We need your fingerprints if you want to pick up your children, nursery tells parents, Jun. 2, 2008, http://www.dailymail.co.uk/news/article-1023669/We-need-fingerprints-want-pick-children-nursery-tells-parents.html.

* cited by examiner

US 11,403,686 B1

SYSTEMS AND METHODS FOR IDENTIFYING A STEWARD

BACKGROUND

A person may have a steward that may be able to act as a steward for the person in one or more respects. It would be advantageous to have systems and methods that can identify additional stewards for the person based on interactions of an existing steward with other individuals or based on other information. A newly identified steward may then be able to act as a steward for the person in one or more respects.

SUMMARY

One embodiment may relate to a financial institution computing system. The system may include a steward database that may store information of a steward of a customer. The information may include interaction information of the steward, which may include information indicative of interactions of the steward with other individuals. The system may further include a steward designation circuit. The steward designation circuit may be configured to determine whether an individual of the other individuals qualifies as a new steward of the customer based on the interaction information of the steward in the steward database. The steward designation circuit may be further configured to designate the individual as a new steward of the customer in response to determining that the individual qualifies as a new steward of the customer.

Another embodiment may relate to a method that may be performed by a financial institution computing system. The method may include accessing, by a steward designation circuit, a steward database that may store information of a steward of a customer. The information may include interaction information of the steward, which may include information indicative of interactions of the steward with other individuals. The method may further include determining, by the steward designation circuit, whether an individual of the other individuals qualifies as a new steward of the customer based on the interaction information of the steward in the steward database. The method may further include designating, by the steward designation circuit, the individual as a new steward of the customer in response to determining that the individual qualifies as a new steward of the customer.

Another embodiment may relate to non-transitory computer readable media that may have computer-executable instructions embodied therein that, when executed by a steward designation circuit of a financial institution computing system, may cause the financial institution computing system to perform operations. The operations may include accessing a steward database that may store information of a steward of a customer. The information may include interaction information of the steward, which may include information indicative of interactions of the steward with other individuals. The operations may further include determining whether an individual of the other individuals qualifies as a new steward of the customer based on the interaction information of the steward in the steward database. The operations may further include designating the individual as a new steward of the customer in response to determining that the individual qualifies as a new steward of the customer.

DETAILED DESCRIPTION

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting. For example, embodiments of systems and methods discussed herein may be relevant to any of a variety of circumstances where identifying a steward for a person may be useful.

Embodiments of systems and methods for identifying a steward are discussed below. A person may have a steward that may be able to act as a steward for the person in one or more respects. Embodiments of systems and methods discussed below are able to identify additional stewards for the person based on interactions of an existing steward with other individuals, based on relationships of the existing steward with other individuals, based on dependability information of the other individuals, or based on other information. A newly identified steward may then be able to act as a steward for the person in one or more respects.

In certain embodiments, the person with the one or more stewards may be a customer of a financial institution. In certain embodiments, for example, a steward of a customer may be able to act on behalf of a customer in one or more regards, may be able to receive information associated with the customer, may be able to control certain transactions of the customer (e.g., approve a transaction, reject a transaction, etc.), etc. However, embodiments of systems and methods discussed herein may be relevant to any of a variety of circumstances where identifying a steward for a person may be useful, whether or not that person is a customer of a financial institution.

Embodiments of systems and methods discussed below are able to identify additional stewards for the person based on information about interactions of an existing steward with other individuals, based on information about relationships of the existing steward with other individuals, based on dependability information of the other individuals, or based on other information. In certain embodiments, any such information may be stored in databases that are part of a system to identify a steward, or may be accessed from sources external to the system.

Figure 1:
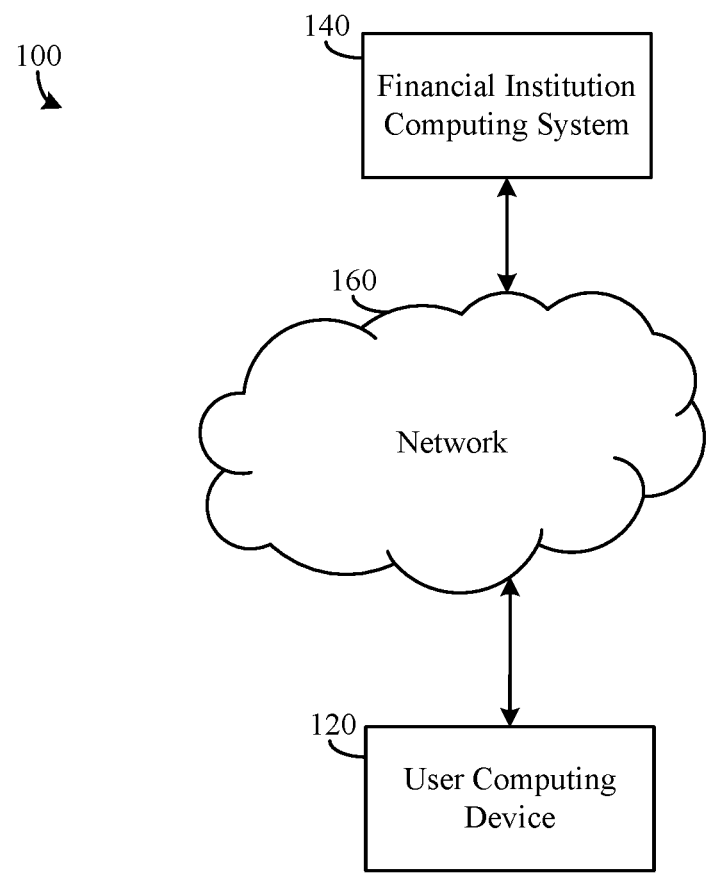
FIG. 1 is a block diagram illustrating a system for identifying a steward, according to an example embodiment.

Referring to FIG. 1, a block diagram illustrating a system 100 for identifying a steward is shown according to an example embodiment. Certain embodiments of system 100 may include a financial institution computing system 140 of a financial institution, and a computing device 120. In certain embodiments, financial institution computing system 140 and computing device 120 may be configured to communicate with each other over network 160. The network 160 may be any data exchange medium, which may include, for example, wireless networks (e.g., cellular networks, Bluetooth®, WiFi, Zigbee®, etc.), wired networks (e.g., Ethernet, DSL, cable, fiber-based, etc.), or a combination thereof. In some embodiments, the network 160 includes the internet.

In certain embodiments, computing device 120 may be a computing system. In certain embodiments, computing device 120 may be associated with a customer with one or more financial accounts at the financial institution, or with an authorized user of one or more financial accounts at the financial institution. In certain embodiments, computing device 120 may be accessible to the public, such as, for example, at a restaurant or a public library. In certain embodiments, computing device 120 may include one or more processors or non-transitory storage mediums housing one or more logics configured to enable the computing device 120 to exchange data over the network 160, execute software applications, access websites, generate graphical user interfaces, and perform other similar operations. In certain embodiments, examples of computing device 120 may include a computer such as a desktop or laptop computer, smartphones, tablets, wearable computing devices such as smartwatches, an infotainment system of a vehicle, a computing device in an appliance, a smart TV, and any other type of computing device.

In certain embodiments, financial institution computing system 140 may be a computing system at a financial institution capable of maintaining customer accounts (e.g., bank accounts, payment card accounts, etc.). In certain embodiments, the financial institution may include any commercial or private financial institution, including, for example, commercial or private banks, credit unions, credit card companies, investment brokerages, or the like. In certain embodiments, in response to a received transaction request, the financial institution computing system 140 may be configured to authenticate the transaction information, authorize the transaction request, process the transaction or transfer funds accordingly. In certain embodiments, financial institution computing system 140 may be configured to transmit a message to computing device 120, such as, for example, indicating that an individual has been designated as a new steward of a customer as will be further explained below.

Figure 2:
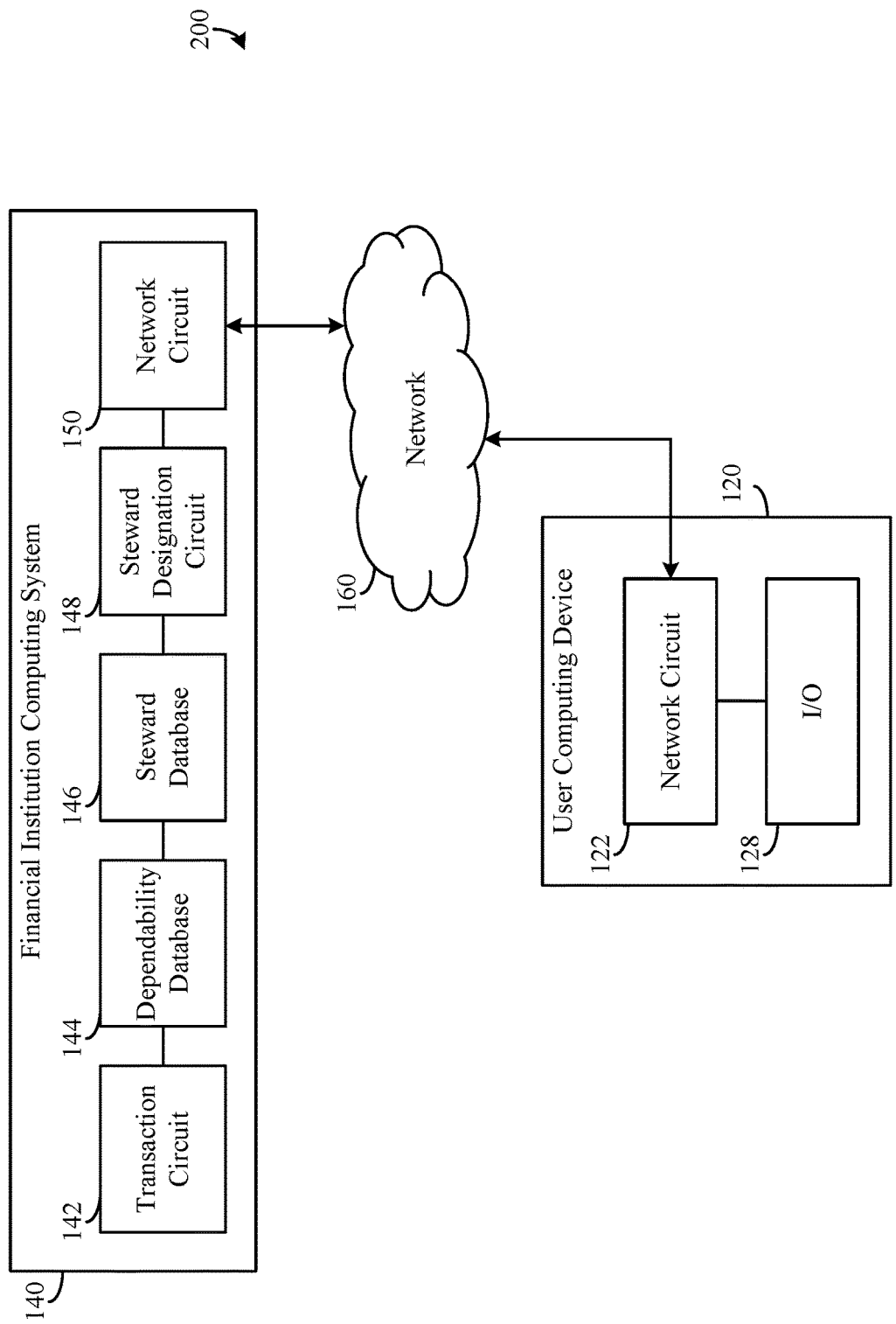
FIG. 2 is a block diagram illustrating an example embodiment of the system for identifying a steward shown in FIG. 1.

Referring to FIG. 2, an example embodiment of the system for identifying a steward shown in FIG. 1 is shown in more detail as system 200. System 200 includes example embodiments of financial institution computing system 140, network 160 and computing device 120 of FIG. 1.

In certain embodiments, computing device 120 may include a network circuit 122 enabling the computing device 120 to exchange data over the network 160, and an input/output device ("I/O") 128. In certain embodiments, the input/output device 128 may include hardware and associated logics configured to enable computing device 120 to exchange information with a user. In certain embodiments, an input aspect of the input/output device 128 may allow the user to provide information to the computing device 120, and may include, for example, a keyboard, a mouse, a keypad, a touchscreen, a touchpad, a joystick, a microphone, a camera, a scanner, a fingerprint scanner, an eye scanner, a sensor that detects movement, accelerometers, a user input device engageable to the computing device 120 via a USB, serial cable, Ethernet cable, wirelessly, and so on, or any other type of input device that may be used with a computing device. In certain embodiments, an output aspect of the input/output device 128 may allow the user to receive information from the computing device 120, and may include, for example, a display, a printer, a speaker, a vibrating component such as a motor, illuminating icons, LEDs, an output device engageable to the computing device 120 via a USB, serial cable, Ethernet cable, wirelessly, and so on, or any other type of output device that may be used with a computing device. In certain embodiments, input/output device 128 may be configured to include assemblies that allow the financial institution computing system 140 to exchange information with the user computing device 120. Such assemblies may include, for example, cables, radio frequency transceivers (e.g., RF or NFC-based transceivers), other wireless transceivers (e.g., Bluetooth™, laser-based data transmitters, etc.), cellular connections, etc.

In certain embodiments, the financial institution computing system 140 may include a steward designation circuit 148, a steward database 146, and a network circuit 150 enabling the financial institution computing system 140 to exchange information over the network 160. In certain embodiments, the financial institution computing system 140 may include a dependability database 144. In certain embodiments, the financial institution computing system 140 may include a transaction circuit 142. Certain embodiments may not include one or more of these databases, and certain embodiments may not include one or more of these circuits.

In certain embodiments, a database that may form part of financial institution computing system 140, such as steward database 146, allows the financial institution computing system 140 to retrievably store information relating to one or more of the operations discussed herein, and may include non-transient data storage mediums (e.g., local disc, flash-based hard drives, solid state drives, or any other type of drives, network servers, and the like), remote data storage facilities (e.g., cloud servers), portable data storage mediums, or any other type of data storage mediums.

In certain embodiments, steward database 146 stores information of a steward of a customer of a financial institution. In certain embodiments, the information of the steward in steward database 146 may include interaction information of the steward, including information indicative of interactions of the steward with other individuals. In certain embodiments, steward designation circuit 148 of financial institution computing system 140 may be configured to access interaction information of the steward from steward database 146. In certain embodiments, financial institution computing system 140 may not include a steward database 146 and steward designation circuit 148 may be configured to access interaction information of the steward from external sources. In certain embodiments, financial institution computing system 140 may include a steward database 146 and steward designation circuit 148 may be configured to access interaction information of the steward from steward database 146, external sources, or both.

In certain embodiments, a steward of a customer may be able to act as a steward of the customer in one or more respects. In certain embodiments, the steward may be able to act as a steward of the customer in one or more respects associated with a financial institution of the customer or with accounts of the customer at the financial institution. In certain embodiments, the steward may able to receive information regarding the customer or regarding transactions of the customer, act on behalf of the customer in one or more regards, receive alerts or notices regarding the customer or regarding transactions of the customer, approve or reject transactions of the customer, conduct transactions on behalf of the customer, etc., or any combination thereof. For example, a steward of a customer may receive an alert when the customer purchases, or is about to purchase, certain goods or services, for example, goods that could be harmful to the customer's health, such as, for example, cigarettes or alcohol. As an additional example, a steward of a customer may receive an alert when the customer purchases, or is about to purchase, goods or services with a cost higher than a certain amount. As an additional example, the steward of a customer may receive an alert when the customer conducts, or is about to conduct, a transaction in an certain location, such as for example, at a bar, at a dangerous part of a town or at a location far from a school, or during certain times of day, such as for example, after midnight or during school hours. As an additional example, the steward may also have the ability to approve or reject a transaction of the customer before it is finalized. In certain embodiments, what a steward of a customer may or may not be able to do, or the information that the steward may or may not be able to receive, may be specified by the customer. For example, in certain embodiments, the customer may specify his or her preferences regarding what a steward may or may not be able to do, or regarding the information that a steward may or may not be able to receive using computing device I/O 128 of computing device 120. In certain embodiments, a customer may send these preferences to financial institution computing system 140 over network 160 via computing device network circuit 122 of computing device 120.

In certain embodiments, interaction information of the steward, such as that that may be accessed from steward database 146 or that may be accessed from external sources, may include any information that may be indicative of interactions of the steward with any other individuals. The interactions may be, for example, personal, electronic, via mail, etc. For example, interaction information may include information associated with locations of the steward and other individuals. This information may help determine, for example, that individuals that are physically close to the steward for extended periods or in multiple occasions may be individuals that, for example, the steward may trust or may have a close connection to. Information associated with locations of the steward and other individuals may include any information that may be associated with location information for an individual such as, for example, residential addresses, work addresses, locations of transactions, location of mobile devices associated with the individual, location of GPS devices associated with the individual, geolocation data, location information of computing devices associated with the individual or used by the individual, photographs of the individual captured by cameras or computing devices in known locations, voice recordings of an individual captured by recording devices in known locations, location information provided by electronic sources, such as an online community or social network, or any other information that may be associated with any other actions, sources or devices that may be indicative of a location of an individual. For example, interaction information may include information associated with interactions of the steward in an online community or social network. For example, repeated photographs of a steward with an individual, or the type of photographs of a steward with an individual (e.g., in general assembly vs. birthday or holiday party) may indicate, for example, that the steward trusts or may be close to the individual. Information associated with other information in an online community or social network may also help determine which individuals may be close to the steward. Interaction information may also include, for example, information associated with communications of the steward with other individuals, such as, for example, information associated with calls, emails, texts, instant messages, messages using various electronic applications, communications in an online community or social network, etc., or any combination thereof. This information, such as the volume of communications or type of communications, may also be indicative of which individuals may be close to the steward.

As additional examples, interaction information of a steward may also include information associated with individuals that the steward went to school with, such as information in school records, information associated with members of groups that a steward belongs to or has belonged to in the past, information associated with the steward's calendar, information associated with individuals that the steward works with or has worked with in the past, information associated with the steward's communications, information associated with the steward's online communities and social networking data, information associated with the steward's employment records, information associated with the steward's employment, information associated with the steward's HR records, information associated with the steward's social profiles or communities, whether online or otherwise (e.g., professional community, church community, etc.), etc., or any combination thereof. As additional examples, interaction information of a steward may also include information associated with online purchases or gifts made by the steward, or any physical mailings sent by steward, including to whom the steward sends packages, purchases or gifts, on which days of the year, or the type of packages and purchases sent. Any information indicative of any interactions of an individual with other individuals, such as the examples listed above, or any other information that may be indicative of interactions that an individual may have with other individuals may be part of the interaction information of the steward.

In certain embodiments, the steward designation circuit 148 may be configured to access in steward database 146 the interaction information of an existing steward, including the information indicative of interactions of the steward with other individuals, and determine whether an individual of the other individuals qualifies as a new steward of the customer based on the interaction information. In certain embodiments, steward designation circuit 148 may be further configured to designate the individual as a new steward of the customer in response to determining that the individual qualifies as a new steward for the customer.

As noted above, in certain embodiments, financial institution computing system 140 may not include a steward database 146 and steward designation circuit 148 may be configured to access interaction information of the steward from external sources. In certain embodiments, financial institution computing system 140 may include a steward database 146 and steward designation circuit 148 may be configured to access interaction information of the steward from steward database 146, external sources, or both.

In certain embodiments, designating an individual as a new steward of a customer may enable the new steward to act as a steward of the customer in one or more respects. In certain embodiments, the new steward may be able to take one or more of the actions that the existing steward is able to take with regard to the customer. In certain embodiments, the new steward may be able to receive information that the existing steward is able to receive with regard to the customer. In certain embodiments, the new steward may be able to act as a steward of the customer in one or more respects associated with a financial institution of the customer or with accounts of the customer at the financial institution. In certain embodiments, the new steward may able to receive information regarding the customer or regarding transactions of the customer, act on behalf of the customer in one or more regards, receive alerts or notices regarding the customer or regarding transactions of the customer, approve or reject transactions of the customer, conduct transactions on behalf of the customer, etc., or any combination thereof. For example, a new steward of a customer may receive an alert when the customer purchases, or is about to purchase, certain goods or services, for example, goods that could be harmful to the customer's health, such as, for example, cigarettes or alcohol. As an additional example, a new steward of a customer may receive an alert when the customer purchases, or is about to purchase, goods or services with a cost higher than a certain amount. As an additional example, the new steward of a customer may receive an alert when the customer conducts, or is about to conduct, a transaction in an certain location, such as for example, at a bar, at a dangerous part of a town or at a location far from a school, or during certain times of day, such as for example, after midnight or during school hours. As an additional example, the new steward may also have the ability to approve or reject a transaction of the customer before it is finalized. In certain embodiments, what a new steward of a customer may or may not be able to do, or the information that the new steward may or may not be able to receive, may be specified by the customer. For example, in certain embodiments, the customer may specify his or her preferences regarding what a new steward may or may not be able to do, or regarding the information that a new steward may or may not be able to receive using computing device I/O 128 of computing device 120. In certain embodiments, a customer may send these preferences to financial institution computing system 140 over network 160 via computing device network circuit 122 of computing device 120.

In certain embodiments, a customer may be able to specify or choose a level of trust or dependability that should be associated with an individual, and what the individual may or may not be able to do as a steward of the customer, or the information that the individual may or may not be able to receive as a steward of the customer, may be based on the level of trust or dependability specified or chosen by the customer. In certain embodiments, the customer may specify or choose said level of trust or dependability, or send it to financial institution computing system 140 over network 160 via computing device network circuit 122, using computing device I/O 128 of computing device 120.

In certain embodiments, the information of a steward of a customer in steward database 146 may include relationship information of the steward, including information indicative of relationships of the steward with other individuals. In certain embodiments, relationship information of the steward may include, for example, information indicative of family relationships of the steward. In certain embodiments, relationship information of the steward may include, for example, information indicative of other type of relationships of the steward, personal or otherwise. In certain embodiments, relationship information of the steward may include, for example, information indicative of relationships of the steward with any other individuals. For example, relationship information of the steward may include information indicative of family relationships of the steward, such as information associated with genealogy of the steward, birth records, familial relationships, family name, hospital records, financial records, employment records, public records, etc., or any other information that may be indicative of relationships of a steward, or that may be indicative, for example, of who are the direct and indirect family members of a steward.

In certain embodiments, relationship information of the steward may overlap with interaction information of the steward, including with interaction information such as that described above, or may be part of the interaction information of the steward. In certain embodiments, steward designation circuit 148 of financial institution computing system 140 may be configured to access relationship information of the steward from steward database 146. In certain embodiments, financial institution computing system 140 may not include a steward database 146, or steward database 146 may not include relationship information, and steward designation circuit 148 may be configured to access relationship information of the steward from external sources. In certain embodiments, financial institution computing system 140 may include a steward database 146, and steward designation circuit 148 may be configured to access relationship information of the steward from steward database 146, external sources, or both.

In certain embodiments, the steward designation circuit 148 may be configured to access in steward database 146 relationship information of an existing steward, including information indicative of relationships of the steward with other individuals, and determine whether an individual of the other individuals qualifies as a new steward of the customer based on the relationship information. In certain embodiments, steward designation circuit 148 may be configured to determine, whether an individual qualifies as a new steward for the customer based on interaction information of the steward, on relationship information of the steward, or both.

As noted above, in certain embodiments, financial institution computing system 140 may include a steward database 146 and may access interaction information of a steward or relationship information of a steward from steward database 146. In certain embodiments, financial institution computing system 140 may not include a steward database 146, or steward database 146 may not include interaction information or relationship information, and steward designation circuit 148 may access interaction information of the steward or relationship information of the steward from external sources. In certain embodiments, steward designation circuit 148 may access interaction information of the steward or relationship information of the steward from steward database 146, external sources or both.

In certain embodiments, steward designation circuit 148 may be configured to determine whether an individual qualifies as a new steward of the customer based also, or alternatively, on dependability information associated with the individual.

In certain embodiments, dependability information may include dependability information associated with one or more individuals with whom an existing steward has interactions or a relationship. In certain embodiments, for example, dependability information may include information associated with an individual that may be indicative of dependability or trustworthiness, such as information in police records, criminal records, credit history, financial records, financial history, bank deposits, regularity of deposits, tax information, traffic records, public records, court filings, driving history, educational history, income, occupation, employment history, health records, medical records, mental health records, insurance records, memberships, information associated with any vices, transaction history, purchase history, information about goods or services purchased by the individual (i.e., type of movies, type of foods, amount of alcohol purchased, medicines purchased, etc.), online history, rankings received by the individual, such as social rankings or professional rankings (including but not limited to rankings by organizations, rankings by social groups, rankings by professional networks, rankings by social networks or online communities, online rankings, etc.), information about areas frequented by the individual, information about merchants frequented by the individual, information about areas or merchants where individual conducts purchases, recommendations received by the individual, such as social recommendations or professional recommendations (including but not limited to recommendations by organizations, by social groups, by professional networks, by social networks or online communities, online recommendations, etc.), awards received by the individual, or any other information that may be indicative of the dependability or trustworthiness of an individual.

In certain embodiments, dependability information may be part of a dependability database 144 in financial institution computing system 140, may reside in external sources, or both. In certain embodiments, financial institution computing system 140 may not include a database 144 with dependability information. Steward designation circuit 148 may be configured to access dependability information from dependability database 144, from external sources, or from both.

In certain embodiments, financial institution computing system 140 may include a transaction circuit 142 that may be configured to, for example, authorize a transaction by a new steward on behalf of a customer, process a transaction by a new steward on behalf of a customer, send an alert or notice to a new steward associated with a customer or with a transaction of a customer, send information to a new steward associated with a customer or with a transaction of a customer, receive an authorization from a new steward to complete a transaction of the customer, receive a denial of authorization from a new steward to complete a transaction of the customer etc., or any combination thereof. In certain embodiments, transaction circuit 142 may send or receive information to or from a new steward over network 160 via network circuit 150. Certain embodiments may not include a transaction circuit 142.

In certain embodiments, steward designation circuit 148 may be configured to send, over network 160 via network circuit 150, a notification to the customer after determining whether the individual qualifies as a new steward of the customer, or wait to receive, over network 160 via network circuit 150, an indication from the customer authorizing the designation of the individual as a new steward for the customer before designating the individual as a new steward for the customer. In certain embodiments, the customer may receive the notification from the steward designation circuit 148 over network 160 via computing device network circuit 122, and may view the notification using computing device I/O 128 of computing device 120. In certain embodiments, the customer may send the indication authorizing the designation to steward designation circuit 148, over network 160 via computing device network circuit 122, using computing device I/O 128 of computing device 120.

In certain embodiments, after designating the individual as a new steward for the customer in response to determining that the individual qualifies as a new steward, steward designation circuit 148 may be configured to send, over network 160 via network circuit 150, a notification to the customer indicating that the individual has been designated as a new steward for the customer. In certain embodiments, the steward designation circuit 148 may be configured to enable the customer to change the designation, such as, for example, reject or otherwise cancel the designation of the individual as a new steward. In certain embodiments, the steward designation circuit 148 may be configured to receive, over network 160 via network circuit 150, an indication from the customer changing the designation, such as, for example, rejecting or otherwise canceling the designation, and the steward designation circuit 148 may cancel the designation in response to receiving said indication from the customer. In certain embodiments, the customer may receive the notification from the steward designation circuit 148 over network 160 via computing device network circuit 122, and may view the notification using computing device I/O 128 of computing device 120. In certain embodiments, the customer may cancel or reject the designation, or send an indication to steward designation circuit 148 canceling or rejection the designation, over network 160 via computing device network circuit 122, using computing device I/O 128 of computing device 120.

Figure 3:
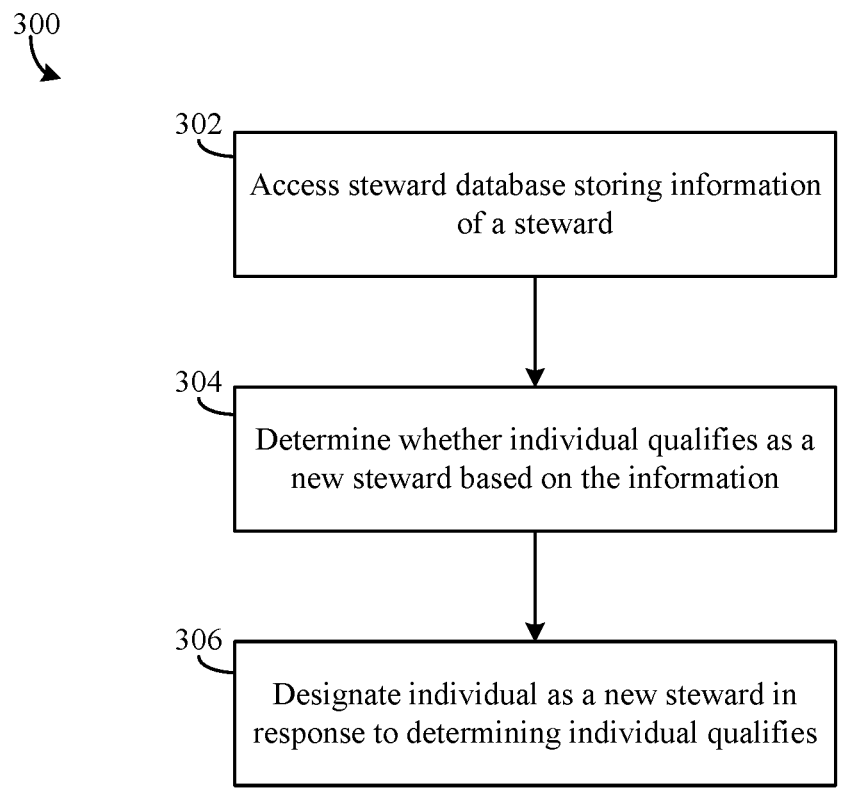
FIG. 3 is a flowchart of a method for identifying a steward, according to an example embodiment.

Referring now to FIG. 3, a flowchart of a method 300 for identifying a steward is shown according to an example embodiment. The method 300 may be performed by a financial institution computing system (e.g., the financial institution computing system 140 of FIGS. 1 and 2).

In certain embodiments, at step 302, a steward database storing information of a steward of a customer is accessed. In certain embodiments, the steward database may be part of a financial institution computing system (e.g., the steward database 146 of the financial institution computing system 140). In certain embodiments, the database is accessed by a steward designation circuit of the financial institution computing system (e.g., the steward designation circuit 148). In certain embodiments, the information of the steward includes interaction information of the steward, including information indicative of interactions of the steward with other individuals as has been described herein.

In certain embodiments, at step 304, the steward designation circuit determines whether an individual of the other individuals qualifies as a new steward of the customer based on the interaction information of the steward in the steward database. In certain embodiments, the information of the steward includes relationship information of the steward, including information indicative of relationships of the steward with other individuals as has been described herein. In certain embodiments, relationship information of the steward may overlap with interaction information of the steward or may be part of the interaction information of the steward. In certain embodiments, at step 304, the steward designation circuit determines whether an individual of the other individuals qualifies as a new steward of the customer based on the relationship information of the steward. In certain embodiments, at step 304, the steward designation circuit determines whether an individual of the other individuals qualifies as a new steward of the customer based on the interaction information of the steward and on the relationship information of the steward. In certain embodiments, at step 304, determining whether the individual qualifies as a new steward of the customer is further based on dependability information associated with the individual.

In certain embodiments, at step 306, the steward designation circuit designates the individual as a new steward of the customer in response to determining that the individual qualifies as a new steward.

Figure 4:
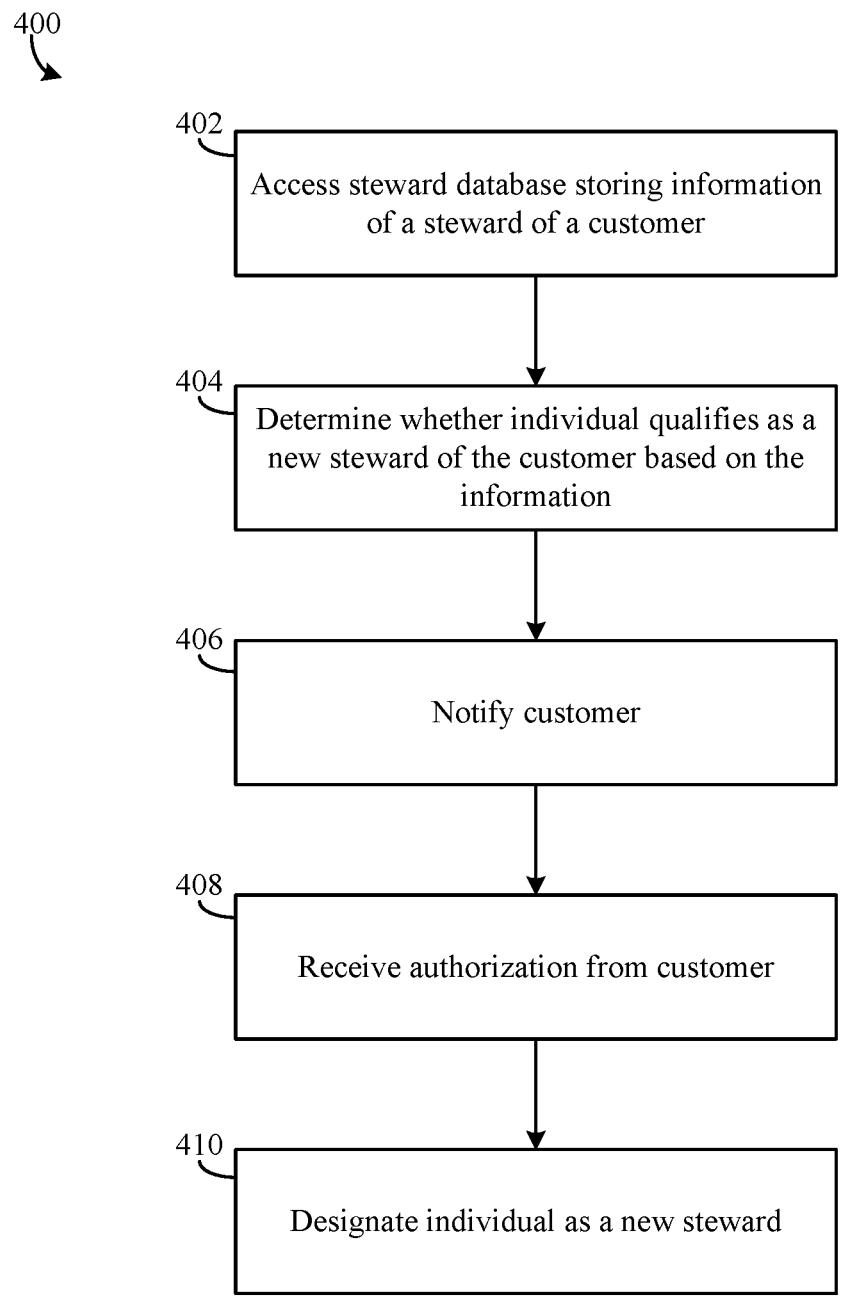
FIG. 4 is a flowchart of a method for identifying a steward, according to an example embodiment.

Referring now to FIG. 4, a flowchart of a method 400 for identifying a steward is shown according to an example embodiment. The method 400 may be performed by a financial institution computing system (e.g., the financial institution computing system 140 of FIGS. 1 and 2).

In certain embodiments, steps 402 and 404 may be performed as described for steps 302 and 304 of method 300. In certain embodiments, at step 406, a notification is sent to the customer after determining whether the individual qualifies as a new steward of the customer. In certain embodiments, the notification is sent by a steward designation circuit of a financial institution computing system (e.g., the steward designation circuit 148 of financial institution computing system 140), over a network (e.g., the network 160) via a network circuit part of the financial institution computing system (e.g., the network circuit 150). In certain embodiments, the customer may receive the notification over the network, via a computing device network circuit (e.g., computing device network circuit 122), and may view the notification using an output aspect of a computing device (e.g., computing device 120).

In certain embodiments, at step 408, an authorization for the designation is received from the customer. In certain embodiments, the steward designation circuit receives, over the network via the network circuit, and indication from the customer authorizing the designation of the individual as a new steward. In certain embodiments, the customer may send the indication authorizing the designation to the steward designation circuit, over the network via the computing device network circuit, using an input aspect of the computing device.

In certain embodiments, at step 408, the steward designation circuit designates the individual as a new steward of the customer in response to determining that the individual qualifies as a new steward in step 404 and receiving the authorization from the customer in step 408.

Figure 5:
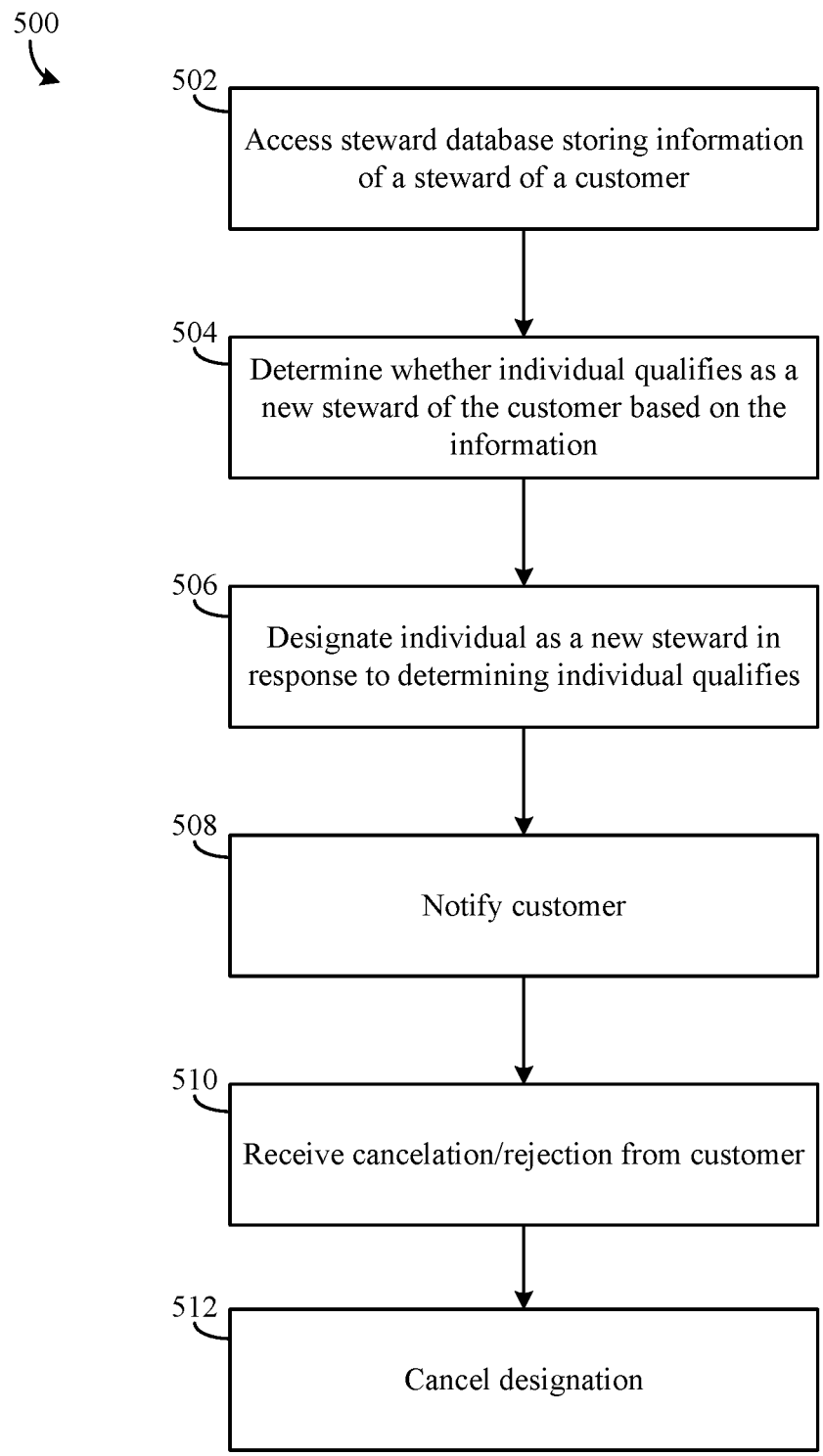
FIG. 5 is a flowchart of a method for identifying a steward, according to an example embodiment.

Referring now to FIG. 5, a flowchart of a method 500 for identifying a steward is shown according to an example embodiment. The method 500 may be performed by a financial institution computing system (e.g., the financial institution computing system 140 of FIGS. 1 and 2).

In certain embodiments, steps 502, 504 and 506 may be performed as described for steps 302, 304 and 306 of method 300. In certain embodiments, at step 508, a notification is sent to the customer after designating the individual as a new steward for the customer in step 506. In certain embodiments, the notification may indicate that the individual has been designated as a new steward for the customer. In certain embodiments, the notification is sent by a steward designation circuit of a financial institution computing system (e.g., the steward designation circuit 148 of financial institution computing system 140), over a network (e.g., the network 160) via a network circuit part of the financial institution computing system (e.g., the network circuit 150). In certain embodiments, the customer may receive the notification over network (e.g., the network 160) via a computing device network circuit (e.g., computing device network circuit 122), and may view the notification using an output aspect of a computing device (e.g., computing device 120).

In certain embodiments, at step 510, a cancelation or rejection of the designation is received from the customer. In certain embodiments, the steward designation circuit receives, over the network via the network circuit, and indication from the customer rejecting or otherwise canceling the designation. In certain embodiments, the customer may send the indication rejecting or canceling the designation to the steward designation circuit, over the network via the computing device network circuit, using an input aspect of the computing device.

In certain embodiments, at step 512, the steward designation circuit cancels the designation of the individuals as a new steward of the customer in response to receiving the indication from the customer rejecting or canceling the designation in step 510.

Certain embodiments include non-transitory computer readable media having computer-executable instructions embodied therein that, when executed by financial institution computing system 140, including certain instructions by steward designation circuit 148, causes the financial institution computing system 140 to perform operations described herein, or any operations that may be performed by any embodiments of financial institution computing system 140.

Certain embodiments described herein have been described with reference to drawings. The drawings illustrate certain details of embodiments that implement example systems, methods, non-transitory computer readable media having computer-executable instructions, and programs described herein. However, describing example embodiments with drawings should not be construed as imposing on the disclosure any limitations that may be present in the drawings. For example, elements shown in drawings may or may not be included in embodiments of the systems and methods herein.

It should be understood that no claim element herein is to be construed under the provisions of 35 U.S.C. § 112(f), unless the element is expressly recited using the phrase "means for."

It should be further understood that "or" should be construed as inclusive or, such that, for example, "A or B" means A, B, or A and B, and for example, "A, B, or C" means A, B, C, or any combination thereof (e.g., A and B, A and C, B and C).

It should be further understood that a database that may be described as two or more databases in the example embodiments or claims may be implemented as one database. It should be further understood that a database that may be described as one database in the example embodiments or claims may be implemented as two or more databases. It should be further understood that a circuit that may be described as two or more circuits in the example embodiments or claims may be implemented as one circuit. It should be further understood that a circuit that may be described as one circuit in the example embodiments or claims may be implemented as two or more circuits.

It should be further understood that "a" and "an" are not limited to a single instance and should be construed as "one or more," such that, for example, a database "storing information of a steward" is a database storing information of one or more stewards.

As used herein, the term "circuit" may include hardware structured to execute the functions described herein. In some embodiments, each respective "circuit" may execute, or include machine-readable media for configuring the hardware to execute, the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices, including but not limited to devices such as those described herein, any other input devices capable of performing a similar function, and any other input devices that may be used with a computing device. Comparatively, the term "output device," as described herein, may include any type of output device or output devices, including but not limited to devices such as those described herein, any other output devices capable of performing a similar function, and any other output devices that may be used with a computing device.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined and form part of the same step, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of example embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain examples of the disclosure and its practical application to enable one skilled in the art to utilize various embodiments and with various modifications as may be suited to any particular use contemplated. Other substitutions, modifications, changes, and omissions may be made in the design, operating conditions, and arrangement of the embodiments without departing from the scope of the present disclosure as expressed in the appended claims.

What is claimed is:

1. A financial institution computing system, the system comprising:
    a steward database configured to store information of a plurality of stewards of a customer, the information comprising geolocation data of the plurality of stewards and relationship information of the plurality of stewards, the geolocation data including information indicative of one or more interactions of each of the plurality of stewards with other individuals, and the relationship information including information indicative of relationships of each of the plurality of stewards with the other individuals; and a steward designation circuit configured to:

access the steward database to identify an individual of the other individuals;

determine whether the individual of the other individuals qualifies as a new steward of the customer based on both a frequency of communications between the individual and the customer within a geolocation and the relationship information of the individual associated with the customer, wherein the relationship information comprises interactions between the customer and the individual and interaction frequency and context of the customer with the individual determined from social networking photographs;

designate the individual as the new steward of the customer in response to determining that the individual qualifies as the new steward of the customer, wherein the designation is based on both the frequency of communications within the geolocation and the relationship information associated with the customer;

provide, over a network via a network circuit to a first computing device of the customer, a notification to the customer, the notification indicating that the individual has been designated as the new steward of the customer; and receive, over the network via the network circuit from the first computing device of the customer, an input from the first computing device of the customer authorizing the designation of the individual as the new steward associated with a second computing device, wherein the input comprises a preference regarding a level of trust of the new steward, wherein the level of trust comprises what the new steward is allowed to approve and what data the new steward receives;

a transaction circuit configured to:

receive, from the first computing device of the customer via an NFC transceiver, a transaction request comprising an amount, a type of good or service, a time, and a location;

determine the customer is making a transaction above a certain amount and for a good or service that is harmful to the customer based on information associated with the transaction request, wherein the good or service is determined to be harmful based on the good or service being categorized as unhealthy, the transaction request being received a particular time of day, or the transaction request being associated with a particular location;

send, over the network via the network circuit to the second computing device of the new steward in response to determining the amount exceeds a threshold and the good or service is harmful to the customer and based on the level of trust of the new steward, an alert comprising transaction request information associated with the transaction request and the location based on geolocation data received from the first computing device of the customer, wherein the second computing device is sent alerts regarding transaction requests of the first computing device;

receive, over the network via the network circuit from the second computing device of the new steward, an approval of the transaction request; and authorize the transaction request based on the approval.

2. The financial institution computing system of claim 1, wherein designating the individual as a new steward for the customer comprises enabling the individual to (a) act on behalf of the customer in one or more regards, (b) approve a transaction of the customer, (c) reject a transaction of the customer, (d) receive an alert associated with a transaction of the customer, (e) receive an alert associated with the customer, (f) conduct a transaction on behalf of the customer, (g) receive information associated with a transaction of the customer, (h) receive information associated with the customer, (i) receive a notice associated with a transaction of the customer, (j) receive a notice associated with the customer, (k) take an action that the new steward is able to take with regard to the customer, (l) receive information that the new steward is able to receive with regard to the customer, (m) act on behalf of the customer as specified by the customer, (n) receive information associated with the customer as specified by the customer, or any combination of (a)-(n).

3. The financial institution computing system of claim 1, further comprising the transaction circuit configured to (a) authorize a transaction by the new steward on behalf of the customer, (b) process a transaction by the new steward on behalf of the customer, (c) send an alert to the new steward associated with the customer, (d) send an alert to the new steward associated with a transaction of the customer, (e) send a notice to the new steward associated with the customer, (f) send a notice to the new steward associated with a transaction of the customer, (g) send information to the new steward associated with the customer, (h) send information to the new steward associated with a transaction of the customer, (i) receive an authorization from the new steward to complete a transaction of the customer, (j) receive a denial of authorization from the new steward to complete a transaction of the customer, or any combination of (a)-(j).

4. The financial institution computing system of claim 1, wherein the relationship information of the new steward comprises information indicative of family relationships of the new steward.

5. The financial institution computing system of claim 1, wherein determining whether the individual qualifies as the new steward of the customer is further based on dependability information associated with the individual.

6. The financial institution computing system of claim 1, wherein the network circuit further enables the financial institution computing system to exchange information over the network, and wherein the steward designation circuit is further configured to send, over the network via the network circuit, a first notification to the customer after determining whether the individual qualifies as the new steward of the customer.

7. The financial institution computing system of claim 1, wherein the network circuit further configured to enable the financial institution computing system to exchange information over the network, and wherein the steward designation circuit is configured to only designate the individual as the new steward of the customer in response to also receiving, over the network via the network circuit, an indication from the customer authorizing the designation.

8. The financial institution computing system of claim 1, further comprising the network circuit enabling the financial institution computing system to exchange information over the network, and wherein the steward designation circuit is further configured to receive, over the network via the network circuit, an indication from the customer canceling or rejecting the designation of the individual as the new steward of the customer, and to cancel the designation of the individual as the new steward of the customer in response to receiving the indication from the customer.

9. A method performed by a financial institution computing system, the method comprising:

accessing, by a steward designation circuit, a steward database to identify an individual from among a plurality of individuals, the steward database storing information of a plurality of stewards of a customer, the information comprising geolocation data of the plurality of stewards and relationship information of the plurality of stewards, the geolocation data including information indicative of one or more interactions of each of the plurality of stewards with the plurality of individuals, and the relationship information including information indicative of relationships of each of the plurality of stewards with the plurality of individuals;

determining, by the steward designation circuit, whether the individual of the plurality of individuals qualifies as a new steward of the customer based on both a frequency of communications between the individual and the customer within a geolocation and the relationship information of the individual associated with the customer, wherein the relationship information comprises interactions between the customer and the individual and interaction frequency and context of the customer with the individual determined from social networking photographs;

designating, by the steward designation circuit, the individual as the new steward of the customer in response to determining that the individual qualifies as the new steward of the customer, wherein the designation is based on both the frequency of communications within the geolocation and the relationship information associated with the customer;

notifying, via a network to a first computing device of the customer, the customer, the notification indicating that the individual has been designated as the new steward of the customer; and receiving, via the network, an input from the first computing device of the customer authorizing the designation of the individual as the new steward associated with a second computing device, wherein the input comprises a preference regarding a level of trust of the new steward, wherein the level of trust comprises what the new steward is allowed to approve and what data the new steward receives;

receiving, by a transaction circuit from the first computing device of the customer via an NFC transceiver, a transaction request comprising an amount, a type of good or service, a time, and a location;

determining, by the transaction circuit, the customer is making a transaction above a certain amount and for a good or service that is harmful to the customer based on information associated with the transaction request, wherein the good or service is determined to be harmful based on the good or service being categorized as unhealthy, the transaction request being received a particular time of day, or the transaction request being associated with a particular location;

sending, over the network to the second computing device of the new steward in response to determining the amount exceeds a threshold and the good or service is harmful to the customer and based on the level of trust of the new steward, an alert comprising transaction request information associated with the transaction request and the location based on geolocation data received from the first computing device of the customer, wherein the second computing device is sent alerts regarding transaction requests of the first computing device;

receiving, over the network from the second computing device of the new steward, an approval of the transaction request; and authorizing, by the transaction circuit, the transaction request based on the approval.

10. The method of claim 9, wherein designating the individual as the new steward for the customer comprises enabling the individual to (a) act on behalf of the customer in one or more regards, (b) approve a transaction of the customer, (c) reject a transaction of the customer, (d) receive an alert associated with a transaction of the customer, (e) receive an alert associated with the customer, (f) conduct a transaction on behalf of the customer, (g) receive information associated with a transaction of the customer, (h) receive information associated with the customer, (i) receive a notice associated with a transaction of the customer, (j) receive a notice associated with the customer, (k) take an action that the new steward is able to take with regard to the customer, (l) receive information that the new steward is able to receive with regard to the customer, (m) act on behalf of the customer as specified by the customer, (n) receive information associated with the customer as specified by the customer, or any combination of (a)-(n).

11. The method of claim 9, further comprising (a) authorizing, by the transaction circuit, a transaction by the new steward on behalf of the customer, (b) processing, by the transaction circuit, a transaction by the new steward on behalf of the customer, (c) sending, by the transaction circuit, an alert to the new steward associated with the customer, (d) sending, by the transaction circuit, an alert to the new steward associated with a transaction of the customer, (e) sending, by the transaction circuit, a notice to the new steward associated with the customer, (f) sending, by the transaction circuit, a notice to the new steward associated with a transaction of the customer, (g) sending, by the transaction circuit, information to the new steward associated with the customer, (h) sending, by the transaction circuit, information to the new steward associated with a transaction of the customer, (i) receiving, by the transaction circuit, an authorization from the new steward to complete a transaction of the customer, (j) receiving, by the transaction circuit, a denial of authorization from the new steward to complete a transaction of the customer, or any combination of (a)-(j).

12. The method of claim 9, wherein the relationship information of the new steward comprises information indicative of family relationships of the new steward.

13. The method of claim 9, wherein determining, by the steward designation circuit, whether the individual qualifies as the new steward of the customer is further based on dependability information associated with the individual.

14. The method of claim 9, further comprising sending, by the steward designation circuit over the network via a network circuit, a notification to the customer after determining whether the individual qualifies as the new steward of the customer.

15. The method of claim 9, wherein the individual is only designated as the new steward by the steward designation circuit in response to also receiving, over the network via a network circuit, an indication from the customer authorizing the designation.

16. The method of claim 9, further comprising receiving, by the steward designation circuit over the network via a network circuit, an indication from the customer canceling or rejecting the designation of the individual as the new steward of the customer, and canceling the designation of the individual as the new steward of the customer in response to receiving the indication from the customer.

17. A non-transitory computer readable media having computer-executable instructions embodied therein that, when executed by a steward designation circuit of a financial institution computing system, causes the financial institution computing system to perform operations, the operations comprising:

- accessing a steward database to identify an individual from among a plurality of individuals, the steward database storing information of a plurality of stewards of a customer, the information comprising geolocation data of the plurality of stewards and relationship information of the plurality of stewards, the geolocation data including information indicative of one or more interactions of each of the plurality of stewards with the plurality of individuals, and the relationship information including information indicative of relationships of each of the plurality of stewards with the plurality of individuals;
- determining whether the individual of the plurality of individuals qualities as a new steward of the customer based on both a frequency of communications between the individual and the customer within a geolocation and the relationship information of the individual associated with the customer, wherein the relationship information comprises interactions between the customer and the individual and interaction frequency and context of the customer with the individual determined from social networking photographs;
- designating the individual as the new steward of the customer in response to determining that the individual qualifies as the new steward of the customer, wherein the designation is based on both the frequency of communications within the geolocation and the relationship information associated with the customer;
- notifying, via a network to a first computing device of the customer, the customer, indicating that the individual has been designated as the new steward of the customer; and
- receiving, via the network, an input from the first computing device of the customer authorizing the designation of the individual as the new steward associated with a second computing device, wherein the input comprises a preference regarding a level of trust of the new steward, wherein the level of trust comprises what the new steward is allowed to approve and what data the new steward receives;
- receiving, from the first computing device of the customer via an NFC, a transaction request comprising an amount, a type of good or service, a time, and a location;
- determining the customer is making a transaction above a certain amount and for a good or service that is harmful to the customer based on information associated with the transaction request, wherein the good or service is determined to be harmful based on the good or service being categorized as unhealthy, the transaction request being received a particular time of day, or the transaction request being associated with a particular location;
- sending, over the network to the second computing device of the new steward in response to determining the amount exceeds a threshold and the good or service is harmful to the customer and based on the level of trust of the new steward, an alert comprising transaction request information associated with the transaction request and the location based on geolocation data received from the first computing device of the customer, wherein the second computing device is sent alerts regarding transaction requests of the first computing device;
- receiving, over the network from the second computing device of the new steward, an approval of the transaction request; and
- authorizing the transaction request based on the approval.

18. The financial institution computing system of claim 1, wherein the geolocation data is determined based one at least one of a global positioning system (GPS) radio, Wi-Fi positioning system (WPS) radio, and a mobile positioning system (MPS) radio.

* * * * *